US011988043B2

(12) United States Patent
Peterson et al.

(10) Patent No.: US 11,988,043 B2
(45) Date of Patent: May 21, 2024

(54) LADDERS, LADDER HINGES AND RELATED METHODS

(71) Applicant: LITTLE GIANT LADDER SYSTEMS, LLC, Springville, UT (US)

(72) Inventors: Sean R. Peterson, Payson, UT (US); Benjamin L. Cook, Provo, UT (US); Gary M. Jonas, Springville, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 830 days.

(21) Appl. No.: 17/068,989

(22) Filed: Oct. 13, 2020

(65) Prior Publication Data

US 2021/0025230 A1 Jan. 28, 2021

Related U.S. Application Data

(63) Continuation of application No. 15/622,343, filed on Jun. 14, 2017, now Pat. No. 10,801,261.

(Continued)

(51) Int. Cl.

*E06C 1/18* (2006.01)
*E06C 1/10* (2006.01)

(Continued)

(52) U.S. Cl.

CPC .................. *E06C 1/18* (2013.01); *E06C 1/10* (2013.01); *E06C 1/22* (2013.01); *E06C 1/32* (2013.01)

(58) Field of Classification Search

CPC ..... E06C 1/18; E06C 1/10; E06C 1/22; E06C 1/32

See application file for complete search history.

(56) References Cited

U.S. PATENT DOCUMENTS 3,143,185 A * 8/1964 Wenger ..................... E06C 1/32 182/27
3,643,292 A * 2/1972 Mayer .................... A47C 1/026 16/325

(Continued)

FOREIGN PATENT DOCUMENTS

CN 1149661 A 5/1997
CN 2377581 Y 5/2000

(Continued)

OTHER PUBLICATIONS

International Search Report and Written Opinion for PCT/US17/37479 dated Aug. 29, 2017.

*Primary Examiner* — Ryan D Kwiecinski
*Assistant Examiner* — Kathleen M. McFarland
(74) *Attorney, Agent, or Firm* — Dorsey & Whitney LLP

(57) ABSTRACT

Ladders, ladder components and related methods are provided including embodiments of a hinge that may be used in a combination ladder. In one embodiment, a hinge mechanism includes a first hinge assembly and a second hinge assembly. The first and second hinge assemblies are coupled together for relative rotation about a defined axis. An adjustment mechanism enables the two hinge assemblies to be selectively locked or unlocked to prohibit or permit relative rotation, respectively. In one embodiment, the adjustment mechanism includes a lock plate displaceable along a first axis and a retainer displaceable along a second axis. The retainer is configured to hold the lock plate in a disengaged state until a release structure displaces the retainer away from the lock plate. The release structure may be configured to be actuated and displace the retainer upon relative rotation of the hinge assemblies to (or through) a predetermined angular configuration.

17 Claims, 16 Drawing Sheets

Related U.S. Application Data

(60) Provisional application No. 62/349,920, filed on Jun. 14, 2016.

(51) Int. Cl.
*E06C 1/22* (2006.01)
*E06C 1/32* (2006.01)

(56) References Cited

U.S. PATENT DOCUMENTS

| | | | | | |
|---|---|---|---|---|---|
| 3,655,012 | A * | 4/1972 | Hoffman | E06C 1/32 | 182/163 |
| 3,955,240 | A * | 5/1976 | Schuh | E05D 11/1007 | 16/326 |
| 4,152,810 | A * | 5/1979 | Martinez | F16D 71/04 | 403/92 |
| 4,210,224 | A * | 7/1980 | Kummerlin | E06C 1/12 | 182/166 |
| 4,371,055 | A * | 2/1983 | Ashton | E06C 7/081 | 182/194 |
| 4,407,045 | A * | 10/1983 | Boothe | E05D 11/1007 | 403/92 |
| 4,474,264 | A * | 10/1984 | Krause | E06C 1/32 | 16/349 |
| 4,540,306 | A * | 9/1985 | Wang | E06C 1/32 | 16/334 |
| 4,543,006 | A * | 9/1985 | Wang | E06C 1/32 | 16/334 |
| 4,566,150 | A * | 1/1986 | Boothe | E05D 11/1007 | 16/349 |
| 4,645,371 | A * | 2/1987 | Wang | F16C 11/10 | 182/163 |
| 4,666,327 | A * | 5/1987 | Su | E06C 1/32 | 16/329 |
| 4,666,328 | A * | 5/1987 | Ryu | E06C 1/32 | 403/92 |
| 4,697,305 | A * | 10/1987 | Boothe | E06C 1/32 | 16/349 |
| 4,770,559 | A * | 9/1988 | Yoo | F16C 11/10 | 403/324 |
| 4,773,503 | A * | 9/1988 | Purkapile | E06C 1/32 | 16/323 |
| 4,805,737 | A * | 2/1989 | Peng | E06C 1/32 | 182/163 |
| 4,824,278 | A * | 4/1989 | Chang | F16C 11/10 | D25/64 |
| 4,890,950 | A * | 1/1990 | Yoo | F16C 11/10 | 182/163 |
| 4,925,329 | A * | 5/1990 | Chuang | F16C 11/10 | 182/163 |
| 4,974,701 | A * | 12/1990 | Parise | E06C 1/32 | 182/194 |
| 5,022,118 | A * | 6/1991 | Wan-Li | E06C 1/32 | 16/334 |
| 5,026,198 | A * | 6/1991 | Lin | E06C 1/32 | 182/163 |
| 5,058,239 | A * | 10/1991 | Lee | F16C 11/10 | 403/93 |
| 5,142,739 | A * | 9/1992 | Lin | E06C 1/32 | 16/326 |
| 5,163,532 | A * | 11/1992 | McCarty | E06C 1/32 | 182/163 |
| 5,353,892 | A * | 10/1994 | Lu | E06C 1/39 | 182/27 |
| 5,620,272 | A * | 4/1997 | Sheng | E05D 11/1007 | 403/92 |
| 5,954,157 | A * | 9/1999 | Grimes | E06C 7/08 | 16/329 |
| 6,330,733 | B1 * | 12/2001 | Rauschenberger | E06C 1/32 | 16/326 |
| 6,588,547 | B2 * | 7/2003 | Yeh | E06C 1/32 | 182/163 |
| 6,688,797 | B2 * | 2/2004 | Park | F16C 11/10 | 403/93 |
| 6,711,780 | B2 * | 3/2004 | Lee | E06C 1/32 | 16/334 |
| 7,007,344 | B2 * | 3/2006 | Lee | E05D 11/0054 | 403/68 |
| 7,047,597 | B2 * | 5/2006 | Lee | E06C 1/32 | 16/233 |
| 7,093,321 | B2 * | 8/2006 | Burbrink | E06C 1/32 | 182/163 |
| 7,140,072 | B2 * | 11/2006 | Leng | E06C 1/32 | 16/326 |
| 7,234,203 | B2 * | 6/2007 | Latimer | E06C 1/32 | 182/21 |
| 7,306,075 | B2 * | 12/2007 | Winslow | E06C 1/18 | 182/163 |
| 7,341,392 | B2 * | 3/2008 | Yeh | E06C 1/32 | 182/163 |
| 7,364,017 | B2 * | 4/2008 | Moss | E06C 7/42 | 182/163 |
| 7,424,933 | B2 * | 9/2008 | Weiss | E06C 7/084 | 182/163 |
| 7,617,569 | B2 * | 11/2009 | Liao | B62B 5/06 | 16/334 |
| 8,186,481 | B2 * | 5/2012 | Moss | E06C 7/16 | 182/25 |
| 9,222,307 | B2 * | 12/2015 | Gallup | E06C 1/383 | |
| 9,222,452 | B1 * | 12/2015 | Shore | F02M 37/0076 | |
| 9,416,591 | B2 * | 8/2016 | Kieffer | E06C 1/32 | |
| 9,580,959 | B2 * | 2/2017 | Kieffer | E06C 1/125 | |
| 9,797,194 | B2 * | 10/2017 | Moss | E06C 7/423 | |
| 10,487,576 | B2 * | 11/2019 | Ballard | E06C 1/22 | |
| 10,487,580 | B2 * | 11/2019 | Miao | E05D 11/06 | |
| 10,801,261 | B2 * | 10/2020 | Peterson | E06C 1/10 | |
| 11,421,475 | B2 * | 8/2022 | Ballard | E06C 1/22 | |
| 2003/0012595 | A1 * | 1/2003 | Park | E06C 1/32 | 403/84 |
| 2003/0037412 | A1 * | 2/2003 | Lee | E06C 1/32 | 16/326 |
| 2003/0062219 | A1 * | 4/2003 | Yeh | E06C 1/32 | 403/92 |
| 2004/0129497 | A1 * | 7/2004 | Weiss | E06C 1/39 | 182/163 |
| 2004/0216954 | A1 * | 11/2004 | Lee | E06C 1/32 | 182/194 |
| 2005/0028320 | A1 * | 2/2005 | Latimer | E04F 11/064 | 16/231 |
| 2005/0121260 | A1 * | 6/2005 | Leng | E06C 1/32 | 182/156 |
| 2005/0166364 | A1 * | 8/2005 | Lee | E05D 11/0054 | 16/231 |
| 2005/0268434 | A1 * | 12/2005 | Burbrink | E06C 1/32 | 16/324 |
| 2005/0274571 | A1 * | 12/2005 | Simpson | E06C 7/083 | 182/23 |
| 2006/0239768 | A1 * | 10/2006 | Yeh | E06C 1/32 | 403/92 |
| 2007/0201943 | A1 * | 8/2007 | Yeh | E06C 1/32 | 403/100 |
| 2008/0073150 | A1 * | 3/2008 | Lin | E06C 1/32 | 182/163 |
| 2008/0109994 | A1 * | 5/2008 | Liao | B62B 5/06 | 16/319 |
| 2015/0068842 | A1 * | 3/2015 | Moss | E06C 7/423 | 292/341.15 |
| 2015/0315844 | A1 * | 11/2015 | Miao | E06C 1/32 | 16/319 |
| 2016/0153231 | A1 * | 6/2016 | Kieffer | E06C 1/32 | 182/163 |
| 2016/0153232 | A1 * | 6/2016 | Kieffer | E06C 1/32 | 182/104 |

(56) References Cited

U.S. PATENT DOCUMENTS

| | | | | |
|---|---|---|---|---|
| 2017/0254145 A1* | 9/2017 | Ballard | ..................... | E06C 1/22 |
| 2020/0232277 A1* | 7/2020 | Ballard | ..................... | E06C 7/06 |

FOREIGN PATENT DOCUMENTS

| | | | | | |
|---|---|---|---|---|---|
| CN | 2813867 | Y | 9/2006 | | |
| CN | 201747256 | U | 2/2011 | | |
| DE | 2052584 | B2 | 1/1981 | | |
| DE | 202012004438 | U1 | 7/2012 | | |
| EP | 1096102 | A1 | 5/2001 | | |
| KR | 200146389 | Y1 | 6/1999 | | |
| WO | WO-0183929 | A1 * | 11/2001 | ............... | E06C 1/32 |

* cited by examiner

LADDERS, LADDER HINGES AND RELATED METHODS

CROSS-REFERENCE TO RELATED APPLICATIONS

This application is a continuation of U.S. patent application Ser. No. 15/622,343, filed on Jun. 14, 2017, now issued as U.S. Pat. No. 10,801,261, on Oct. 13, 2020, which claims the benefit of U.S. Provisional Patent Application No. 62/349,920, entitled LADDERS, LADDER HINGES AND RELATED METHODS, filed on Jun. 14, 2016, the disclosures of which are incorporated by reference herein in their entireties.

TECHNICAL FIELD

The present invention relates generally to ladders, ladder systems, ladder components, such as hinges, and related methods.

BACKGROUND

Ladders are conventionally used to provide a user thereof with improved access to locations that might otherwise be inaccessible. Ladders come in many shapes and sizes, such as straight ladders, straight extension ladders, stepladders, and combination step and extension ladders (referred to herein as combination ladders). Combination ladders incorporate, in a single ladder, many of the benefits of other ladder designs as they can be used as an adjustable stepladder, a straight ladder or an extension ladder.

Combination ladders are particularly useful as they may be adapted for use in a variety of situations. However, the construction of such ladders often requires design elements to enable the ladder may withstand a variety of different loadings and accommodate different relational positions of the ladder components. For example, such a ladder includes locking mechanisms to enable selective adjustment of different rail and rung assemblies, thereby enabling height adjustment of the ladder. Additionally, such a ladder includes hinge mechanisms which enable selective rotational adjustment of one rail assembly relative to another rail assembly. The hinges, thus, may enable the ladder to be placed in a stepladder configuration, an extension ladder configuration, or in a collapsed, stowable state.

The design of these various components (e.g., the height adjustment mechanism, the hinges, etc.) must take into consideration many factors including strength to withstand loadings while in different positions, the ease of using such mechanisms, the stability of the mechanism while in any of a variety of states or positions, and other safety concerns (e.g., pinching of hands or fingers or the likelihood of being abused in operation by a user). In addition to all of these concerns, the ease and cost of manufacturing such components must also be taken into account in order to bring cost effective solutions to the market Considering the desire within the industry to continually improve the safety, functionality, ergonomics and efficiency of ladders, the present disclosure provides a number of embodiments that provide enhanced ease of use, stability and safety in the use of ladders.

SUMMARY OF THE DISCLOSURE

The present disclosure provides various embodiments of ladders, ladder hinges and related methods. In one embodiment, a ladder is provided that comprises a first rail assembly having a first pair of rails and a first plurality of rungs extending between and coupled to the first pair of rails and second rail assembly having a second pair of rails and a second plurality of rungs extending between and coupled to the second pair of rails. The ladder includes a pair of hinge mechanisms coupled between the first rail assembly and the second rail assembly. Each hinge mechanism comprises a first hinge assembly having at least one hinge plate, a second hinge assembly having at least one hinge plate, the first hinge assembly being rotatably coupled to the second hinge assembly, and an adjustment mechanism configured to selectively permit and prohibit relative rotation of the first hinge assembly and the second hinge assembly. The adjustment mechanism comprises a lock plate biased in a first direction along a first axis, the lock plate having a first portion configured to engage at least one recess formed on a periphery of the at least one hinge plate of the second hinge assembly, the lock plate having an opening formed in a surface thereof. A retainer is biased in a second direction along a second axis and toward contact with the lock plate, the retainer having a protrusion configured for selective engagement with the opening in the lock plate. A release structure is located and configured to be displaced along the first axis such that a portion of the release structure becomes interposed between the retainer and the lock plate to displace the retainer opposite the second direction and displacing the protrusion from the opening of the lock plate.

In one embodiment, the ladder further comprises a biasing member between the release structure and the lock plate, the biasing member biasing the release structure away from the lock plate in the first direction.

In one embodiment, the at least one recess formed on the periphery of the at least one hinge plate of the second hinge assembly includes at least three recesses formed at spaced circumferential locations on the periphery.

In one embodiment, the at least one hinge plate of the first hinge assembly includes a first pair of hinge plates and at least one spacer plate disposed between the first pair of hinge plates.

In one embodiment, the at least one hinge plate of the second hinge assembly includes a second pair of hinge plates and at least one other spacer plate disposed between the second pair of hinge plates.

In one embodiment, the second pair of hinge plates are disposed laterally inwardly of the first pair of hinge plates along an axis upon which relative rotation of the first hinge assembly and the second hinge assembly is effected.

In one embodiment, the at least one other spacer includes at least one radial projection configured to engage the release structure upon relative rotation of the first hinge assembly and the second hinge assembly to a predetermined angular position.

In one embodiment, the at least one radial projection includes at least three radial projections corresponding with three different predetermined angular positions of the first assembly relative to the second assembly.

In one embodiment, the portion of the lock plate is positioned in a first channel formed in the at least one spacer plate, and wherein at least a portion of the retainer is positioned in a second channel formed in the at least one spacer plate.

In one embodiment, the release structure includes two spaced apart arms, with one arm positioned on a different side of the lock plate.

In one embodiment, at least one of the two arms exhibits a tapered geometry for engagement with the retainer.

In one embodiment, at least one of the two arms includes two spaced apart fingers defining a slot therebetween, the slot being sized to receive a portion of the protrusion.

In one embodiment, the lock plate includes a main body portion and at least one laterally extending portion.

In one embodiment, the at least one laterally extending portion extends through a slot formed in the at least one hinge plate of the first hinge assembly.

In one embodiment, the ladder further comprises a first handle coupled with the at least one laterally extending portion.

In one embodiment, the lock plate is substantially T-shaped.

In one embodiment, the first axis and the second axis are substantially orthogonal to one another.

In one embodiment, the first rail assembly further comprises a third pair of rails and a third plurality of rungs extending between and coupled to the third pair of rails, the third pair of rails being slidably coupled with the first pair of rails.

In one embodiment, the second rail assembly further comprises a fourth pair of rails and a fourth plurality of rungs extending between and coupled to the fourth pair of rails, the fourth pair of rails being slidably coupled with the second pair of rails.

In one embodiment, the pair of hinge mechanisms are configured to selectively lock the first rail assembly and the second rail assembly relative to each other in a stored configuration, at least one step ladder configuration and an extension ladder configuration.

Features, elements and aspects of one described embodiment herein may be combined with features, elements or aspects of other described embodiments without limitation.

BRIEF DESCRIPTION OF THE SEVERAL VIEWS OF THE DRAWINGS

The foregoing and other advantages of the disclosure will become apparent upon reading the following detailed description and upon reference to the drawings in which.

DETAILED DESCRIPTION

Figure 1:
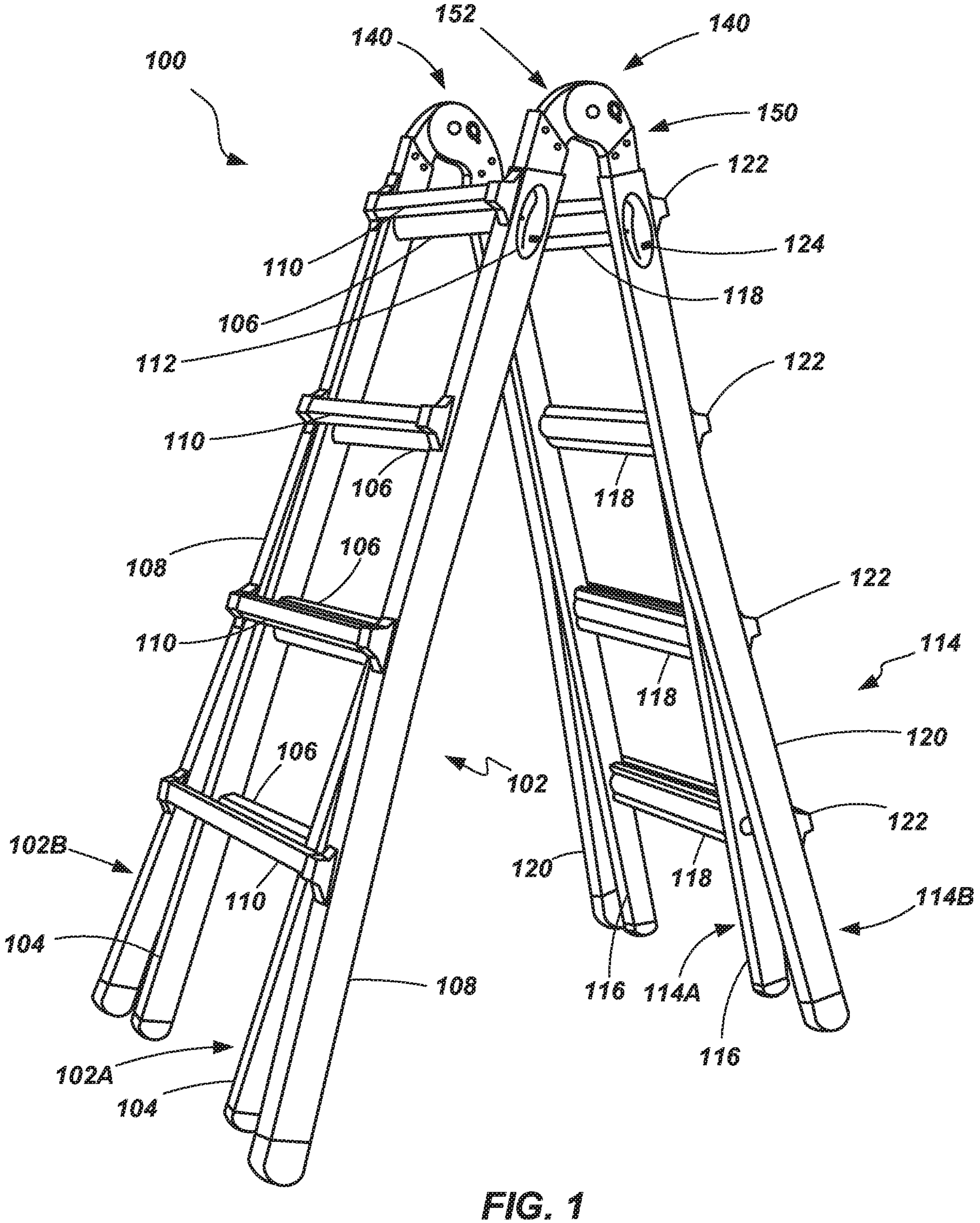
FIG. 1 is a perspective view of a ladder in accordance with an embodiment of the present disclosure.

Referring to FIG. 1, a combination ladder 100 (also referred to as an articulating ladder) is shown. The combination ladder 100 includes a first rail assembly 102 including an inner assembly 102A slidably coupled with an outer assembly 102B. The inner assembly 102A includes a pair of spaced apart rails 104 coupled with a plurality of rungs 106. Likewise, the outer assembly 102B includes a pair of spaced apart rails 108 coupled to a plurality of rungs 110. The rails 104 of the inner assembly 102A are slidably coupled with the rails 108 of the outer assembly 102B. The inner and outer assemblies 102A and 102B may be selectively locked relative to each other such that one or more of their respective rungs 106 and 110 are aligned with each other. A locking mechanism 112 may be configured to engage a portion of the inner rail assembly 102A and the outer rail assembly 102B so as to selectively lock the two assemblies relative to each other. While only a single locking mechanism 112 is shown due to the perspective of the ladder represented in FIG. 1, a second, similar locking mechanism is coupled to the other side of the rail assembly 102.

The combination ladder 100 also includes a second rail assembly 114 that includes an inner assembly 114A slidably coupled with an outer assembly 114B. The inner assembly 114A includes a pair of rails 116 coupled with a plurality of rungs 118 and is configured similarly to the inner assembly of the first rail assembly 102A described hereinabove. Likewise, the outer assembly 114B includes a pair of rails 120 coupled with a plurality of rungs 122 and is configured similarly to the outer assembly 102B of the second rail assembly 102 described hereinabove. Locking mechanisms 124 may be associated with inner and outer assemblies 114A and 114B to enable selective positioning of the inner assembly 114A relative to the outer assembly 114B as described with respect to the first rail assembly 102 hereinabove.

One exemplary locking mechanism that may be used with the first and second rail assemblies 102 and 114 is described in U.S. Pat. No. 8,186,481, issued May 29, 2012, the disclosure of which is incorporated by reference herein in its entirety. While the locking mechanism described in U.S. Pat. No. 8,186,481 is generally described in conjunction with an embodiment of an adjustable step ladder, such a locking mechanism may by readily used with the presently described combination ladder as well. Another example of a locking mechanism 112 is described in U.S. Patent Application No. 62/303,588, filed on Mar. 4, 2016, entitled ADJUSTMENT MECHANISMS, LADDERS INCORPORATING SAME AND RELATED METHODS, and U.S. patent application Ser. No. 15/448,253, filed on Mar. 2, 2017, the disclosures of which are incorporated by reference herein in their entireties. Additionally, in one embodiment, the rail assemblies 102 and 114 may be configured similar to those which are described in U.S. Pat. No. 4,210,224 to Kummerlin, the disclosure of which is incorporated by reference in its entirety.

The first rail assembly 102 and second rail assembly 114 are coupled to each other by way of a pair of hinge mechanisms 140. As will be discussed in further detail below, each hinge mechanism 140 may include a pair of hinge components including a first hinge component (or assembly) 150 coupled with a rail of the first rail assembly's inner assembly 102A and a second hinge component (or assembly) 152 coupled with a rail of the second rail assembly's inner assembly 114A. The hinge components 150 and 152 of the hinge mechanism 140 rotate about a pivot member such that the first rail assembly 102 and the second rail assembly 114 may pivot relative to each other. Additionally, the hinge mechanisms 140 may be configured to lock their respective hinge components (and, thus, the associated rails to which they are coupled) at desired angles relative to each other.

The combination ladder 100 is thus constructed so as to assume a variety of states or configurations. For example, using the locking mechanism (112 or 124) to adjust a rail assembly (102 or 114) enables the ladder 100 to be adjusted in height. In one example, as the first rail assembly 102 is adjusted, with the outer assembly 102B being displaced relative to the inner assembly 102A, the locking mechanism 112 engages the inner and outer assemblies (102A and 102B) when they are at desired relative positions so that at least some of their respective rungs (106 and 110) align with each other (such as shown in FIG. 1), or so that the rungs maintain a desired vertical spacing relative to each other. Considering the embodiment shown in FIG. 1, this enables the ladder, for example, to be configured as a step ladder with four effective rungs at a desired height (as shown in FIG. 1), or to be configured as a step ladder that is substantially taller having five, six, seven or eight effective rungs, depending on the relative positioning of the inner and outer assemblies. It is noted that the inner and outer rail assemblies may be configured with more or fewer rungs than four.

It is also noted that the first rail assembly 102 and the second rail assembly 114 do not have to be adjusted to similar heights (i.e., having the same number of effective rungs). Rather, if the ladder is used on an uneven surface (e.g., on stairs), the first rail assembly 102 may be adjusted to one height while the second rail assembly 114 may be adjusted to a different height in order to compensate for the slope of the supporting surface.

The hinge mechanisms 140 provide for further adjustability of the ladder 100. For example, the hinge pairs 140 enable the first and second rail assemblies 102 and 114 to be adjusted to a variety of angles relative to each other. As shown in FIG. 1, the first and second rail assemblies 102 and 114 may be configured at an acute angle relative to each other such that the ladder may be used as a self-supporting ladder, similar to a step ladder (e.g., the hinge components are positioned such that the ladder assumes a first, deployed state as a step ladder). However, the first and second rail assemblies 102 and 114 may be rotated or pivoted about the hinge mechanisms 140 so that they extend from one another in substantially the same plane (i.e., exhibiting an angle of substantially 180°—placing the ladder in a second, deployed state). When configured in this manner, the ladder may be used as an extension ladder. Moreover, each of the first and second assemblies are still adjustable as to height (i.e., through the relative displacement of their respective inner and outer assemblies). It is additionally noted that the rungs of the various assemblies (i.e., rungs 106, 110, 118 and 122) are configured to have support surfaces on both the tops and the bottoms thereof so as to enable their use in either a step ladder configuration or an extension ladder configuration.

The hinge mechanisms 140 may also enable the first rail assembly 102 and the second rail assembly 114 to be collapsed adjacent each other so that the ladder 100 is placed in a collapsed or stowed/stowable state. Thus, the ladder 100 is able to be configured in a variety of useable conditions and is further able to be collapsed in a relatively small configuration for transportation and stowing of the ladder.

Figure 2:
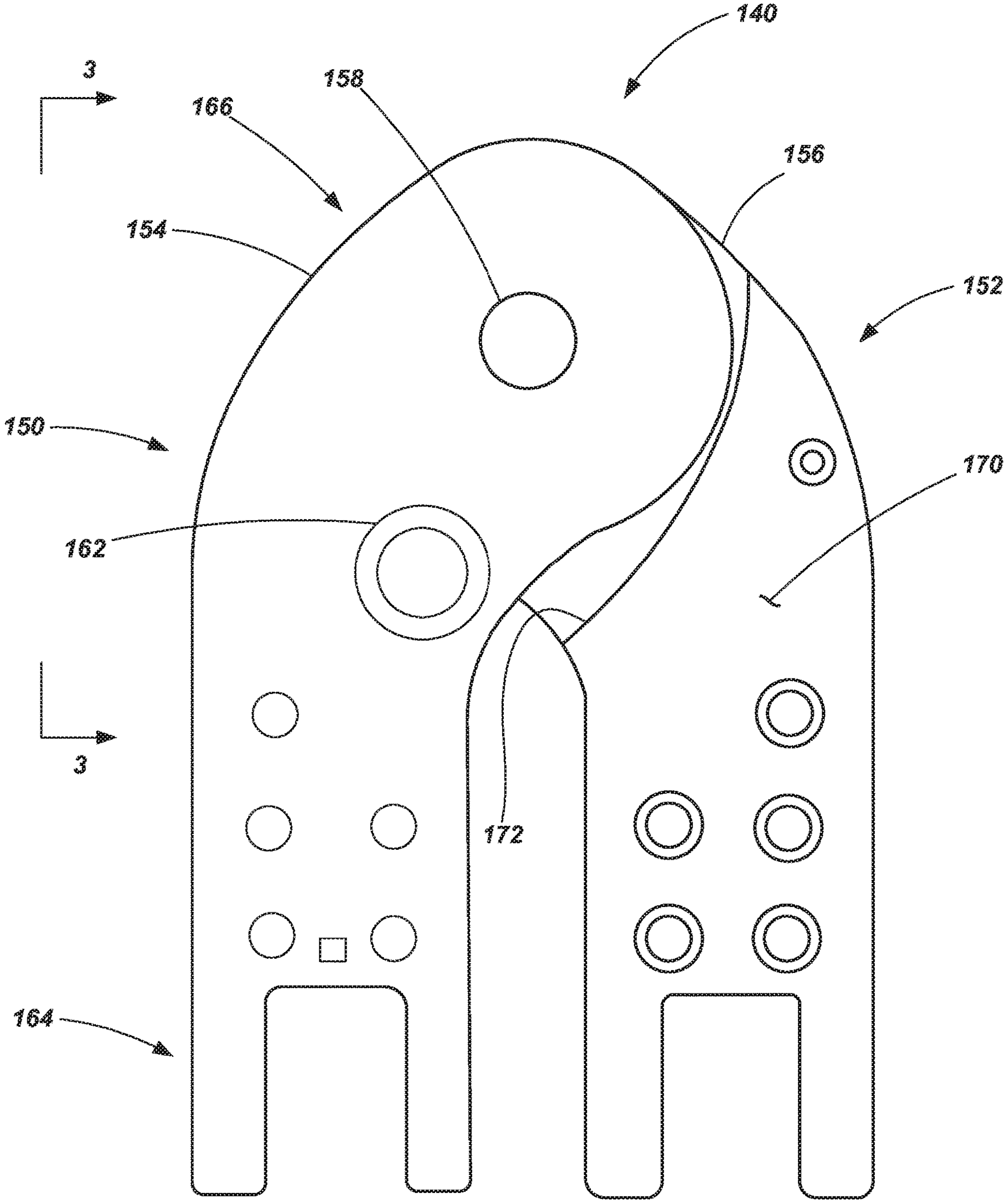
FIG. 2 is a side view of a hinge of the ladder shown in FIG. 1.
Figure 3:
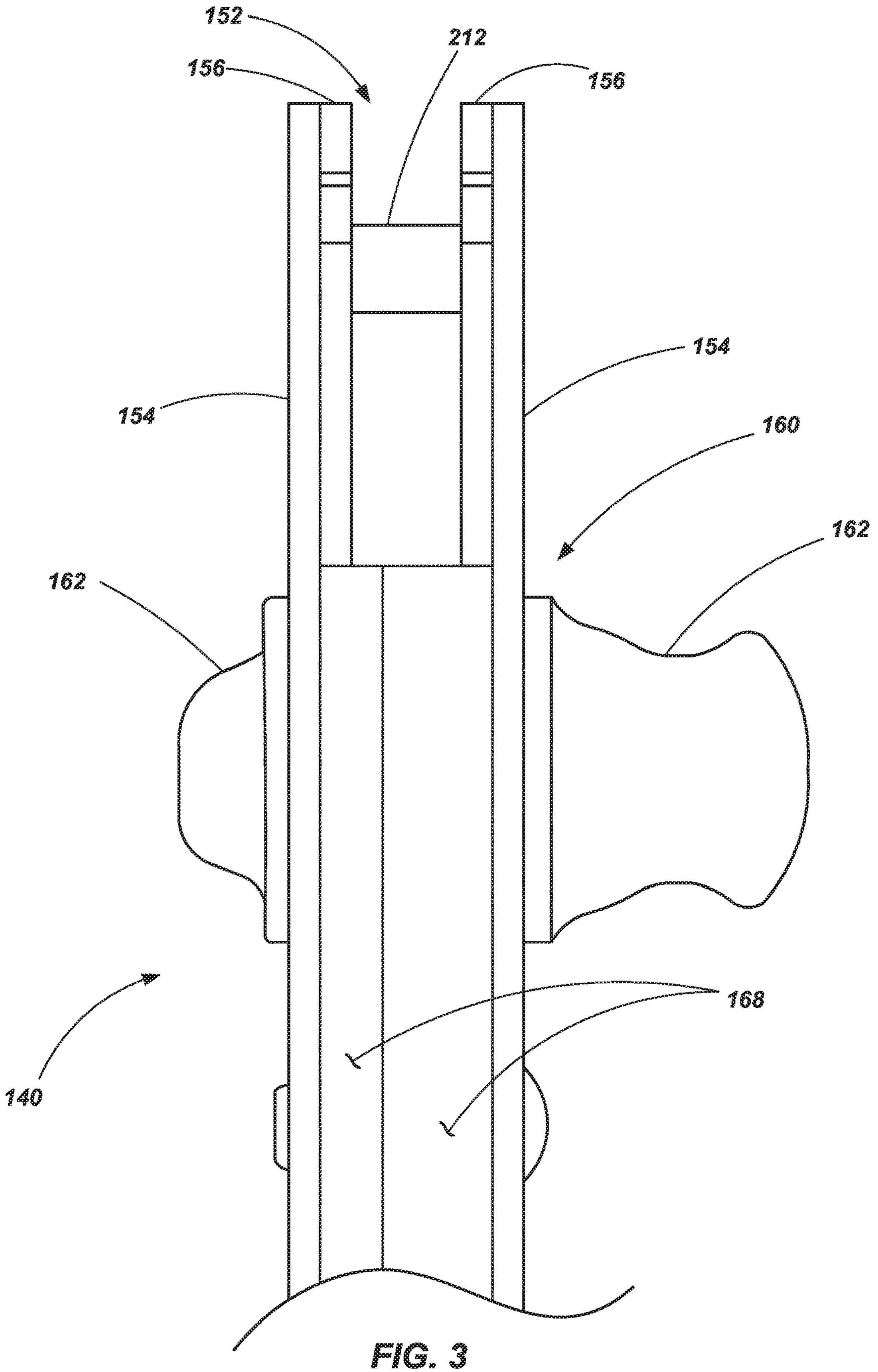
FIG. 3 is a front view of the hinge shown in FIG. 2.

Referring to FIGS. 2 and 3, a hinge mechanism 140 is shown having an outer hinge assembly 150 (also referred to as a first hinge assembly) pivotally coupled with an inner hinge assembly 152 (also referred to as a second hinge assembly). The "inner" and "outer" designations of the hinge assemblies relate to the fact that hinge plates 154 of the outer hinge assembly 150 are spaced laterally outward of the hinge plates 156 of the inner hinge assembly 152 as best seen in

FIG. 3.

The outer and inner hinge assemblies 150 and 152 are coupled together by way of a hinge pin 158 such that the hinge assemblies may rotate relative to each other about an axis extending through the hinge pin 158. As will be discussed in further detail below, the hinge mechanism 140 may be selectively positioned in a variety of states, including a "fully open" state, a "fully closed" state (such as shown in FIG. 2), and one or more states between the fully open and fully closed states—such states corresponding, for example, with the deployed or stowed conditions of the ladder discussed above. An adjustment mechanism 160, which includes an actuating handle 162, enables the selective locking and adjustment of the hinge assemblies 150 and 152 relative to each other.

Figure 4:
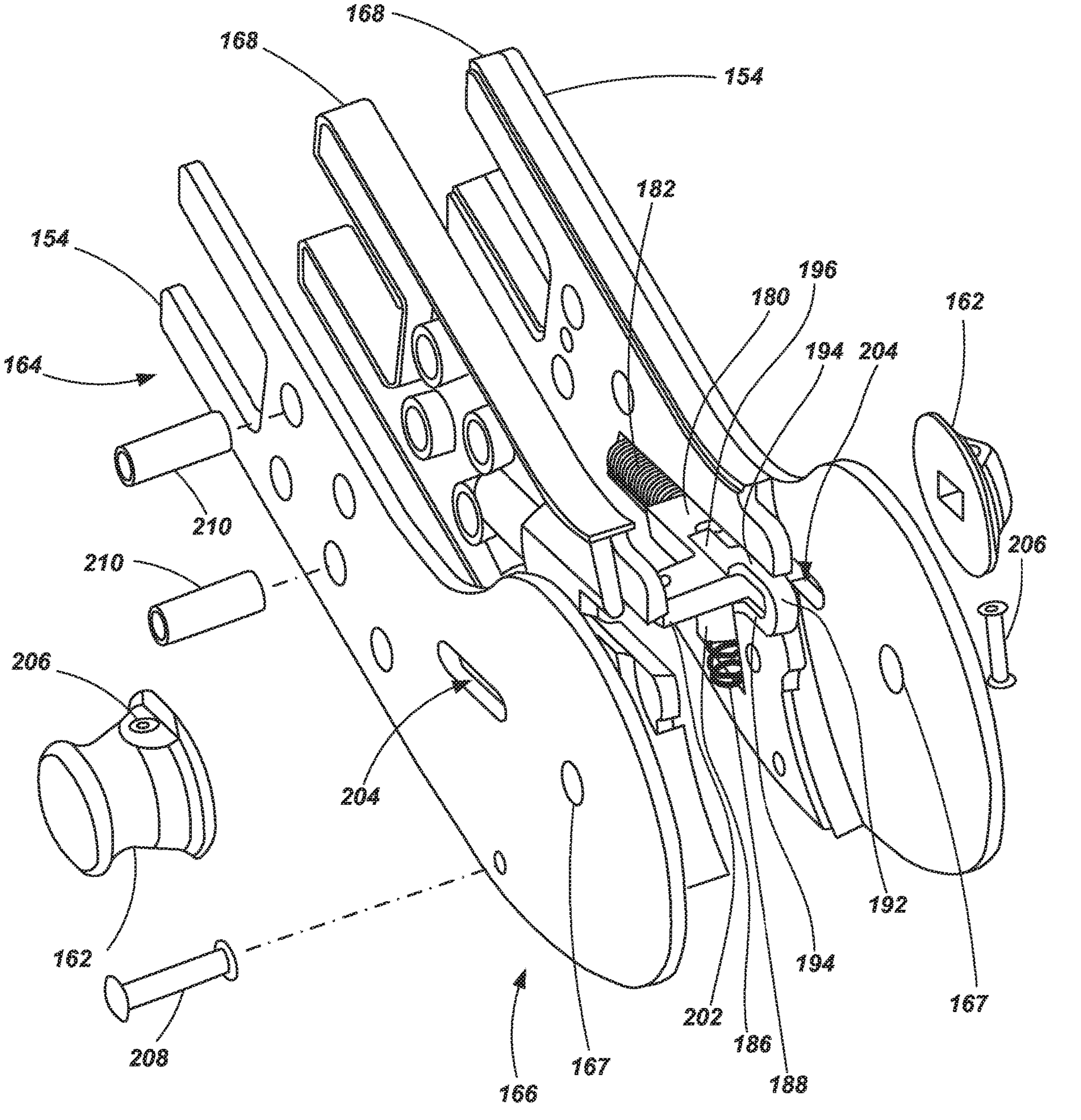
FIG. 4 is an exploded view of a portion of the hinge shown in FIG. 2.
Figure 5:
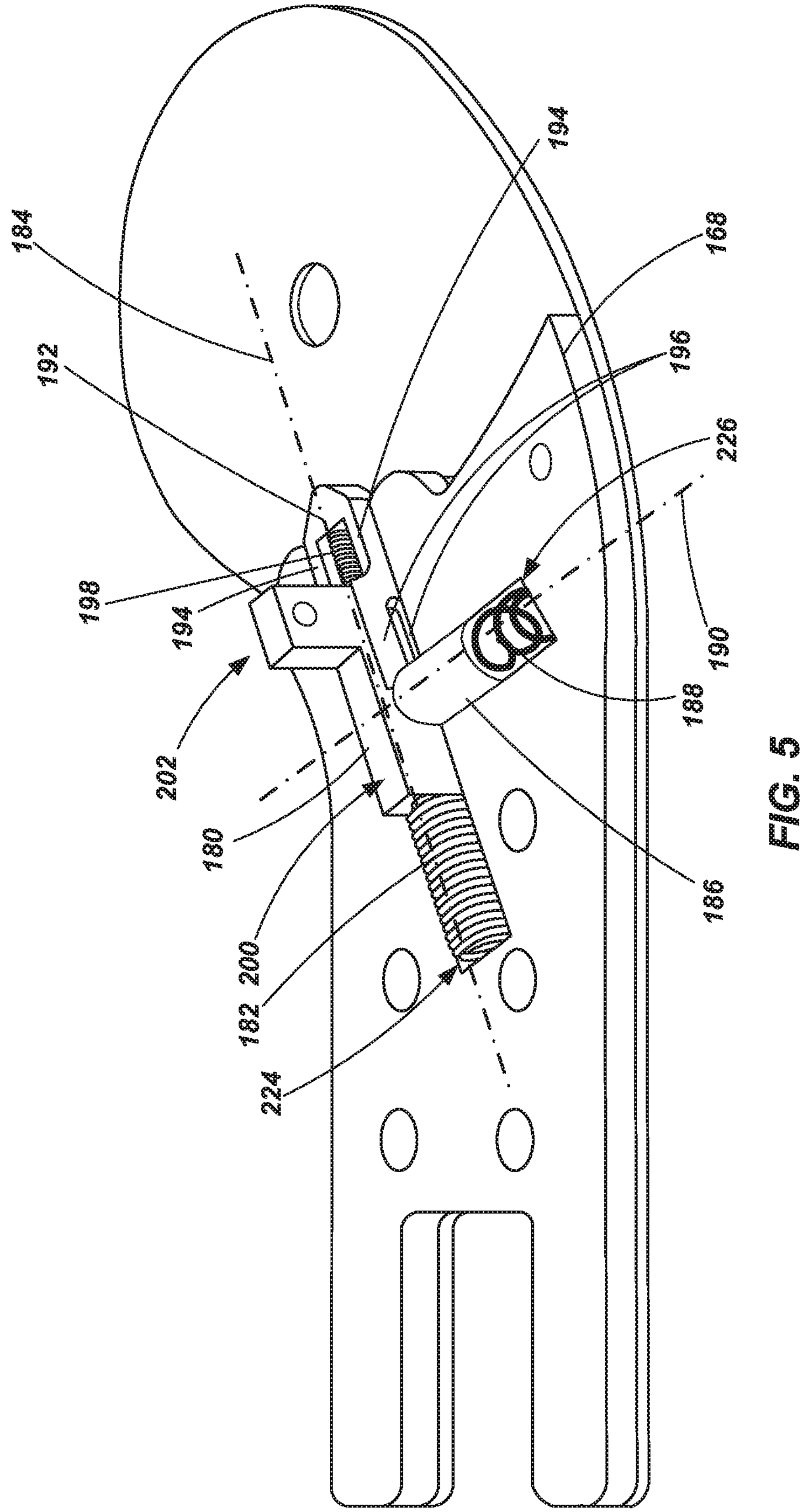
FIG. 5 shows a portion of the hinge shown in FIG. 2.

Referring to FIGS. 4 and 5, FIG. 4 shows an exploded view of the outer hinge assembly 150 and FIG. 5 shows a portion of the outer hinge assembly 150 with various components removed (e.g., one hinge plate 154 and a spacer) to expose various components associated with the adjustment mechanism 160. As previously noted, the outer hinge assembly 150 includes a pair of spaced apart hinge plates 154. The hinge plates 154 include a first portion 164 configured for coupling with a ladder rail (e.g., rail 104 of inner rail assembly 102A or rail 116 of inner rail assembly 114A as shown in FIG. 1) and a second portion 166 configured for coupling with the inner hinge assembly 152 by way of the hinge pin 158 which is inserted through openings 167 formed in the hinge plates 154 (and through a corresponding opening formed in the hinge plate(s) 156 of the inner hinge assembly 152).

The outer hinge assembly 150 additionally includes a pair of spacer plates 168 disposed between the hinge plates 154. The spacer plates 168 may each include an abutment shoulder that abuts a portion of the hinge plates 156 of the inner hinge assembly 152 when the hinge mechanism 140 is in a fully opened state. Similarly, the inner hinge assembly 152 may include a pair of spacer members 170 located on the laterally outer sides of the hinge plates 156 with each spacer member 170 also including an abutment shoulder 172 for engagement with the hinge plates 154 of the outer hinge assembly 150 when the hinge mechanism 140 is in a fully opened state. An example of abutment shoulders or surfaces that engage with mating hinge plates are described in U.S. Pat. No. 7,364,017, entitled COMBINATION LADDER, LADDER COMPONENTS AND METHODS OF MANUFACTURING SAME, the disclosure of which is incorporated herein by reference in its entirety.

In addition to providing a desired spacing of the hinge plates 154 and providing abutment surfaces, the spacer plates 168 may also house a number of components associated with the adjustment mechanism 160. The adjustment mechanism 160 includes a lock plate 180 and lock plate spring 182 (or other biasing member) positioned within a cavity 224 formed in the spacer plates 168 (see, e.g., FIGS. 10A and 10B), with the lock plate spring 182 biasing the lock plate 180 in a first direction along an axis 184 that extends through the lock plate 180 and associated cavity 224. The adjustment mechanism 160 additionally includes a lock plate retainer 186 and retainer spring 188 (or other biasing mechanism) positioned within another cavity 226 formed in the spacer plates 168 (see, e.g., FIGS. 10A and 10B), with the retainer spring 188 biasing the lock plate retainer 186 along an axis 190 that extends in a direction toward the locking plate 180 (e.g., in one embodiment, substantially perpendicular with axis 184). A retainer release structure 192 is disposed in a common cavity 224 (formed in the spacer plates 168) with the lock plate 180 and is configured to slide relative to the lock plate 180, with a pair of spaced apart arms 194 extending along each side of the lock plate 180. A pair of spaced apart fingers 196 extend from one of the arms 194 (e.g., the arm located closest to the lock plate retainer 186), the fingers 196 being configured to slide between the lock plate 180 and the lock plate retainer 186 as will be discussed in further detail below. A release spring 198 (or other biasing member) is positioned between the lock plate 180 and the release structure 192 and is configured to bias the release structure along the axis 184 away from the lock plate 180.

It is noted that the lock plate 180 includes a main body portion 200 and a pair of lateral extensions 202 such that the lock plate generally exhibits a "T" shape. However, other shapes may be utilized as will be appreciated by those of ordinary skill in the art. Each lateral extension 202 passes through an associated slot 204 formed in an adjacent hinge plate 154. The slots are elongated in a direction that is substantially parallel with the axis 184 associated with the lock plate 180. Thus, the lock plate 180 may be displaced along the axis 184 and may be limited by the length of the slots 204 formed in the hinge plates 154, through which the lateral extensions 202 laterally extend and are axially displaced. On the outer side of the hinge plates 154, caps or handles 162 are coupled with the lateral extensions 202 such as by a mechanical fastener 206 (e.g., a rivet) or other appropriate structure or method.

It is noted that, as seen in FIG. 4, the hinge plates 154 and other components may be assembled and held together by way of various fasteners such as, for example, one or more rivets 208, one or more compression pins 210 (e.g., pins having an interference fit with the hinge plates 154), other fasteners, or a combination of multiple types of fasteners such as shown.

Figure 6:
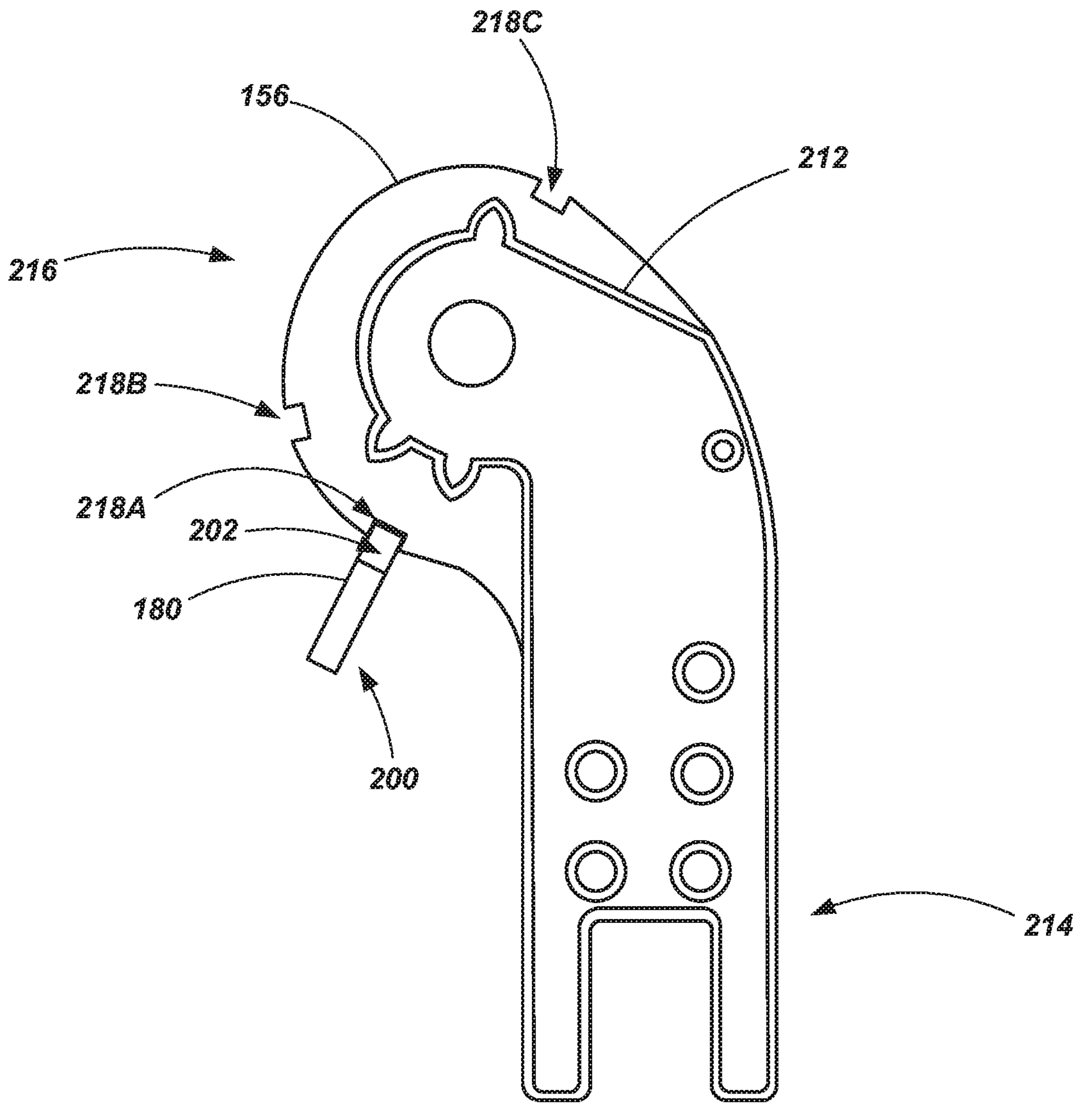
FIGS. 6 and 7 show portions of the hinge shown in FIG. 2 while the hinge is locked in a stowed state.

Referring now to FIG. 6, a portion of the inner hinge assembly 152 is shown in relation to the lock plate 180 of the adjustment mechanism 160 for reference in explaining the operation of the adjustment mechanism 160 and, more specifically, the interaction of the lock plate 180 with the inner hinge assembly 152 (FIGS. 8, 12, 14 and 16, discussed below, are similar views but with the hinge in different states). The inner hinge assembly 152 includes a spacer plate 212 disposed between the two hinge plates 156 (note that in FIG. 6, only a single hinge plate 156 is shown). As with the outer hinge assembly 150, the hinge plates 156 of the inner hinge assembly 152 include a first portion 214 configured for coupling with a ladder rail (e.g., rail 104 of inner rail assembly 102A or rail 116 of inner rail assembly 114A as shown in FIG. 1) and a second portion 216 configured for coupling with the outer hinge assembly 150 by way of the hinge pin 158.

A plurality of notches or recesses 218A-218C are formed in the arcuate peripheral edge of the second portion 216 of the hinge plates 156. These notches 218A-218C are sized and configured to matingly receive a portion of the lock plate 180 such as shown in FIG. 6. When the lock plate 180 is positioned such that a portion of it is disposed within any notch or recess 218A-218C, the first hinge assembly 150 and the second hinge assembly 152 are locked relative to one another such that they may not rotate about the hinge pin 158. Thus, with the first and second hinge assemblies 150 and 152 locked relative to each other, the first and second rail assemblies 102 and 114 of the ladder 100 (FIG. 1) are locked in a given position (e.g., as a step ladder, a straight or extension ladder, or in a stowed condition).

Figure 7:
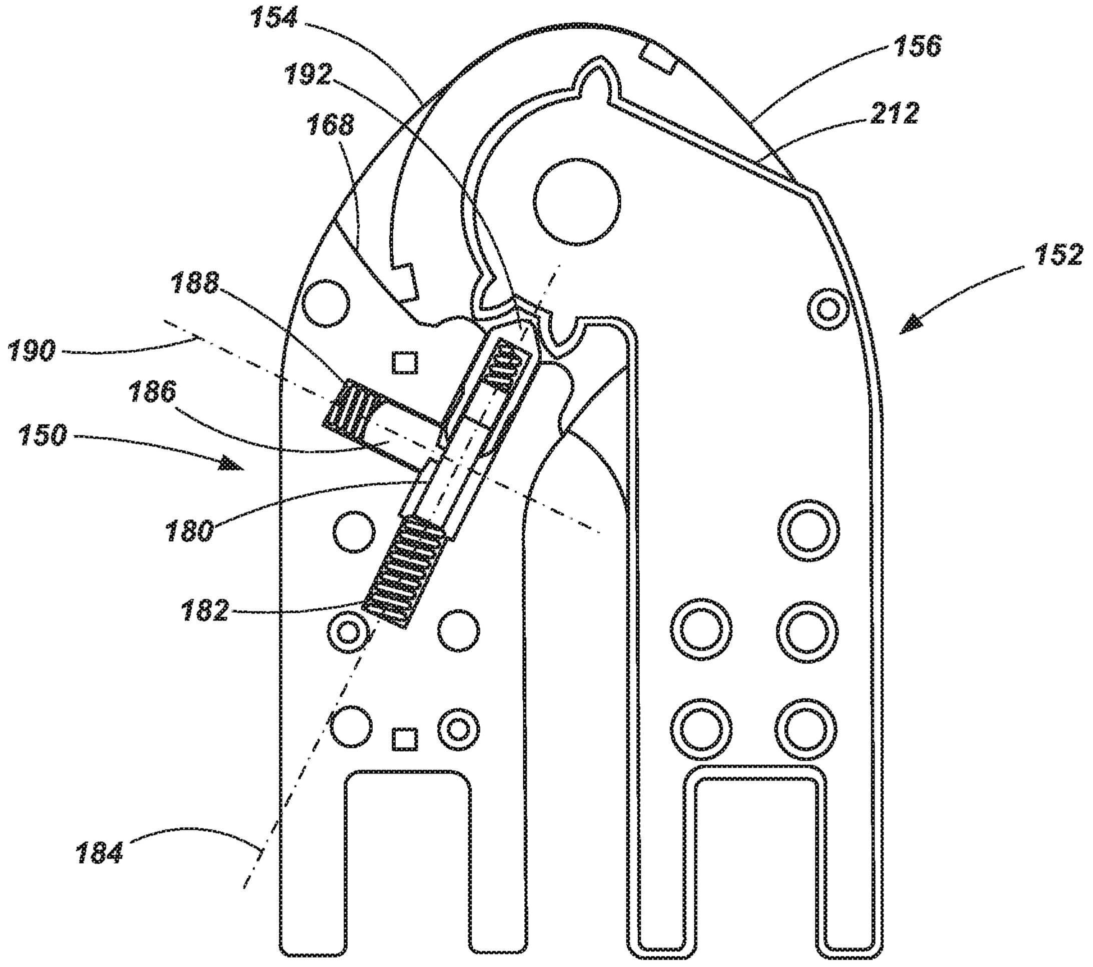

Referring to FIGS. 6 and 7, the hinge mechanism 140 is shown in a collapsed state (e.g., such that the ladder 100 is collapsed, with the first and second rail assemblies 102 and 114 being positioned directly adjacent one another for storage or transportation purposes). In this state, the adjustment mechanism 160 is in a "locked" or engaged state such that a portion of the lock plate 180 extends into the first notch or recess 218A preventing the first and second hinge assemblies 150 and 152 from rotating relative to each other about the hinge pin 158. When it is desired to adjust the ladder (e.g., from the stowed state to a step ladder configuration), a user may displace one of the actuating handles 162 of the adjustment mechanism 160 causing the lock plate 180 to be displaced along axis 184, the lateral extensions 202 thus being displaced within the slots 204 of the hinge plates 154, such that the locking plate 180 is retracted from and disengages the first notch or recess 218A as shown in FIG. 8.

Figure 8:
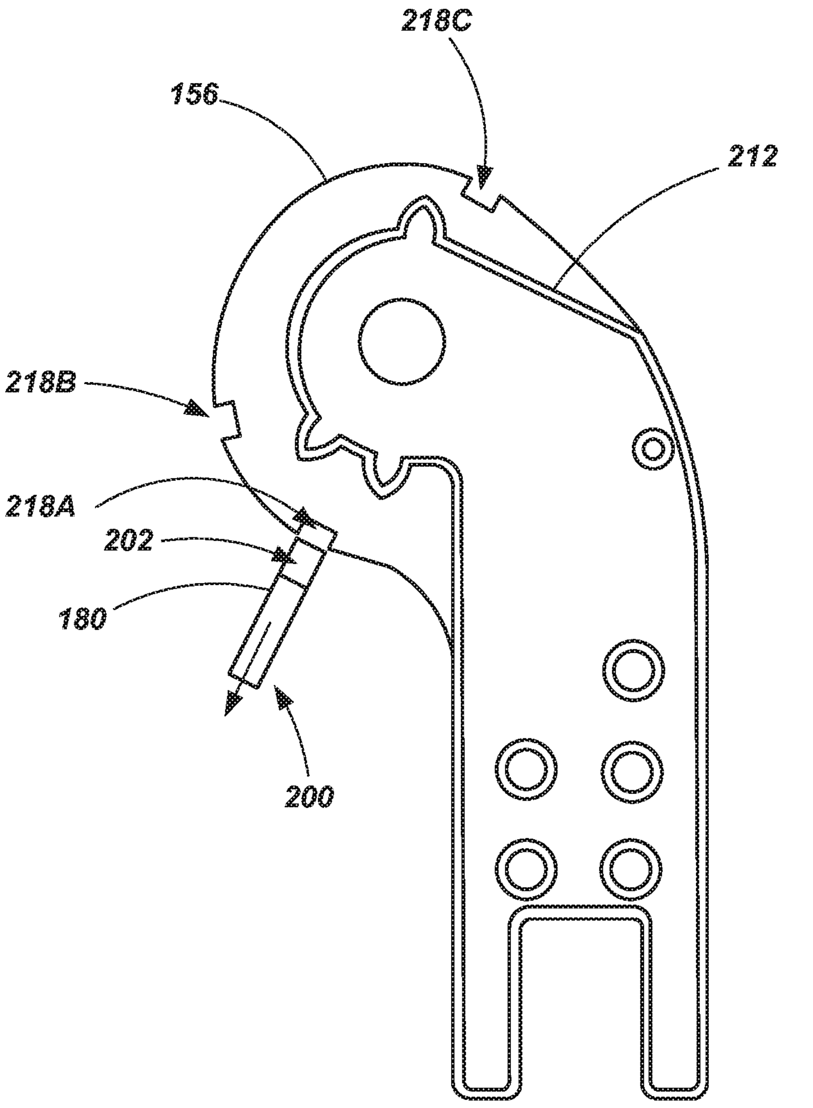
FIGS. 8 and 9 show portions of the hinge of FIG. 2 while in the ladder is in the stowed state and while a locking component has been actuated.
Figure 9:
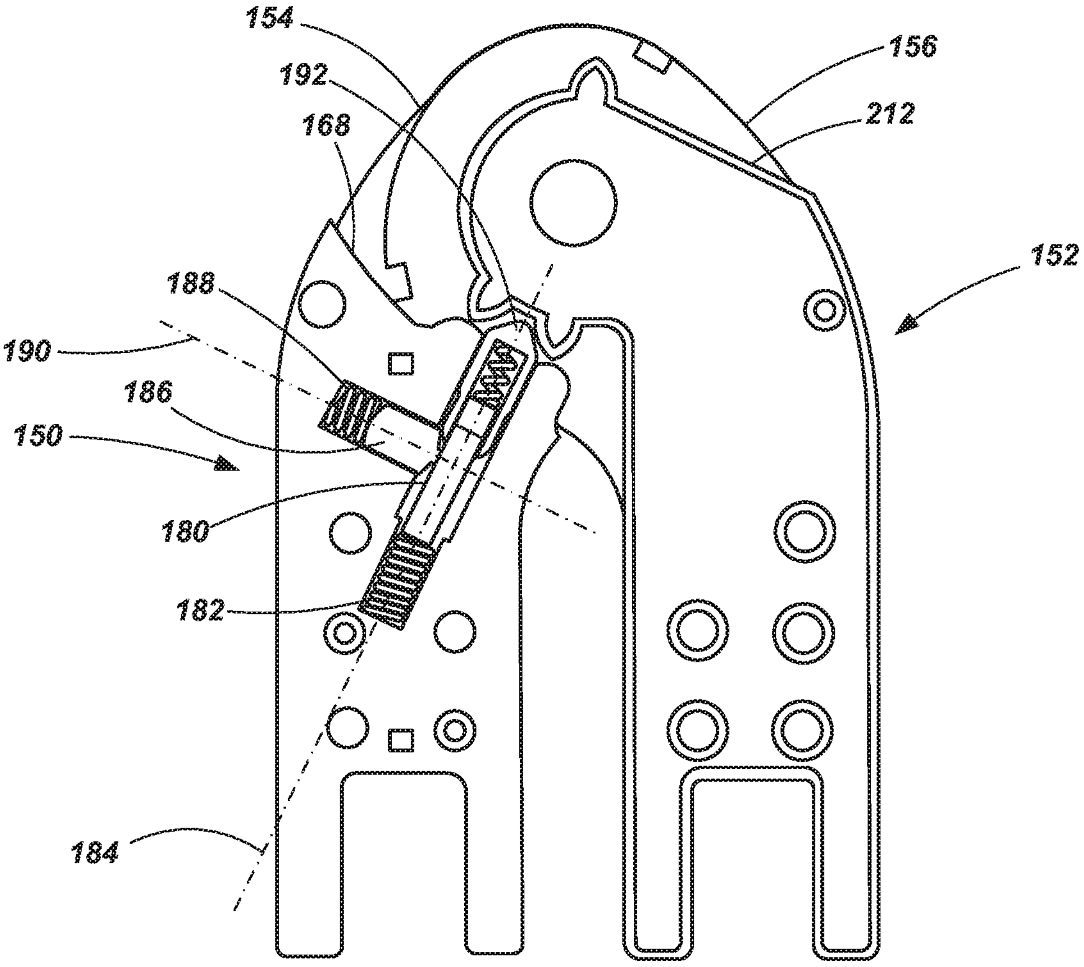

FIGS. 8 and 9 show the hinge mechanism 140 still in a collapsed state, but with the lock plate 180 in a retracted or unlocked position. With the lock plate 180 in the retracted or unlocked position, the hinge assemblies 150 and 152 are able to rotate relative to one another about the hinge pin 158 in order to place the ladder 100 in a different state (e.g., a step ladder state).

Figure 10A:
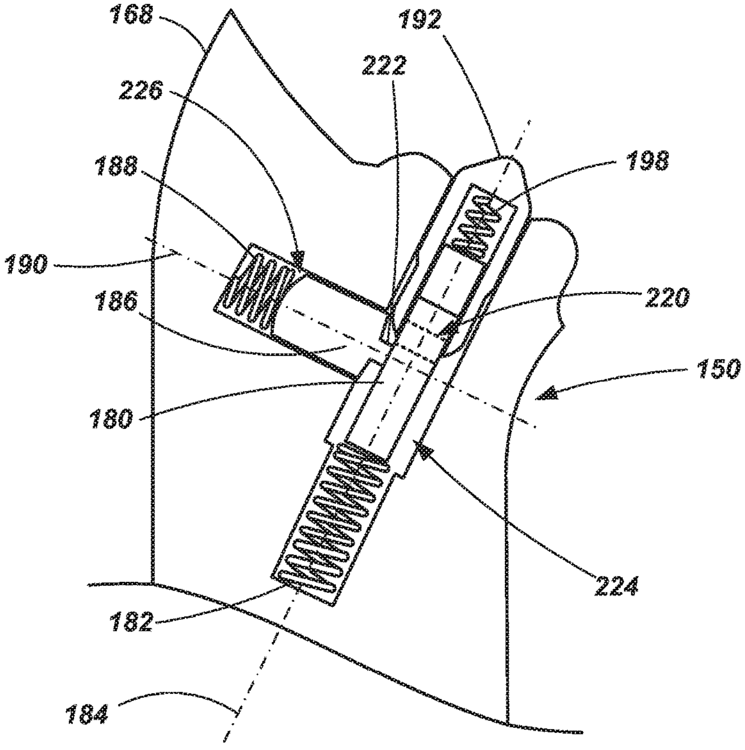
FIGS. 10A and 10B are enlarged detail views of the adjustment/locking mechanism of the hinge shown in FIG. 2 during different states of operation.
Figure 10B:
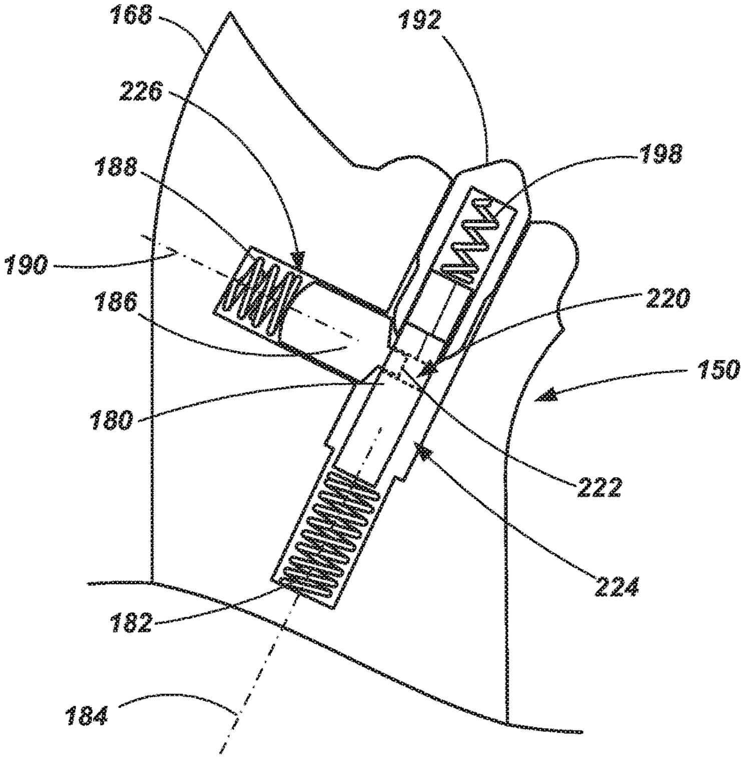

Referring to FIGS. 10A and 10B, when a user retracts the locking plate 180, via handle 162, to place it in the position shown in FIGS. 8 and 9, the retainer 186 and retainer spring 188 act to maintain the lock plate 180 in the retracted or unlocked position until subsequent action is taken as will be described below. In one embodiment, such as illustrated in FIGS. 10A and 10B, the lock plate 180 includes an opening or a hole formed therein. In one embodiment, the opening may include a blind opening. In another embodiment, the opening may include a through-bore 220 (shown in dashed lines in FIGS. 10A and 10B) extending from one surface of the lock plate 180 to an opposing surface. The opening 220 may exhibit any of a variety of geometries (e.g., round, oval, square, etc.) and is configured for receipt of a protrusion 222 formed on an end of the retainer 186. As shown in FIG. 10A, when the lock plate 180 is in a locked or engaged state such that it engages a set of notches or recesses of the hinge plates 154 (e.g., recesses 218A such as depicted in FIGS. 7 and 8), the protrusion 222 abuts the outer surface of the lock plate 180. However, when the lock plate 180 is retracted into an unlocked state, the opening 220 aligns with the protrusion 222 and the biasing force of the retainer spring 188 provides a sufficient force to displace the retainer 186 within its slot or cavity 226 in the spacer plate 168 (along axis 190), causing the protrusion 222 to engage with the opening 220 of the lock plate 180 thereby retaining the lock plate 180 in the retracted position as shown in FIG. 10B.

It is noted that, when the lock plate 180 is displaced within its slot or cavity 224 (along axis 184), the lock plate spring 182 is compressed while the release structure spring 198 elongates with the release structure 192 maintaining its original position within its cavity 224 as shown in FIG. 10A.

Figure 11:
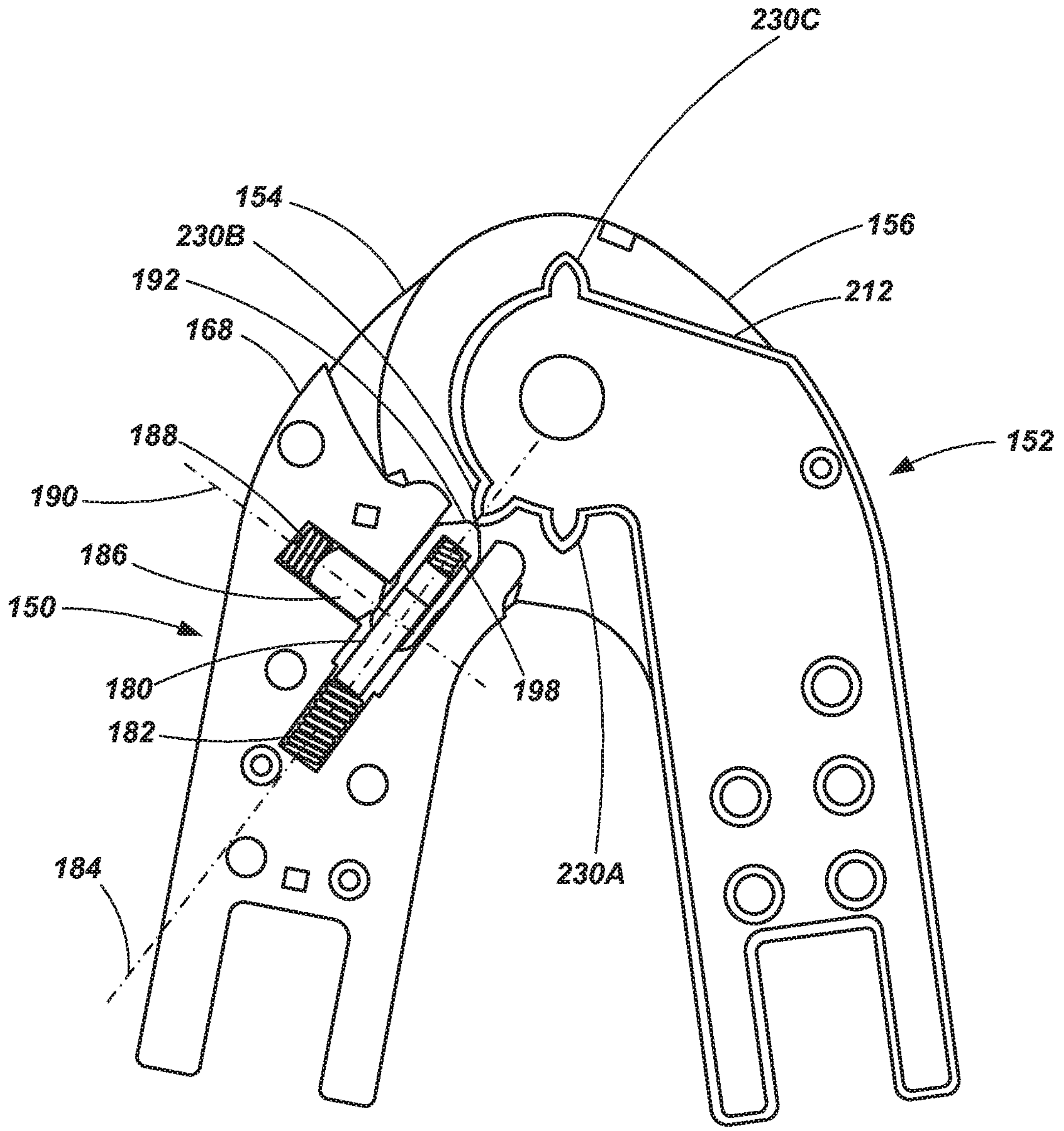
FIGS. 11 and 12 show portions of the hinge of FIG. 2 while the ladder is transitioning between a stowed state and a first deployed state.
Figure 12:
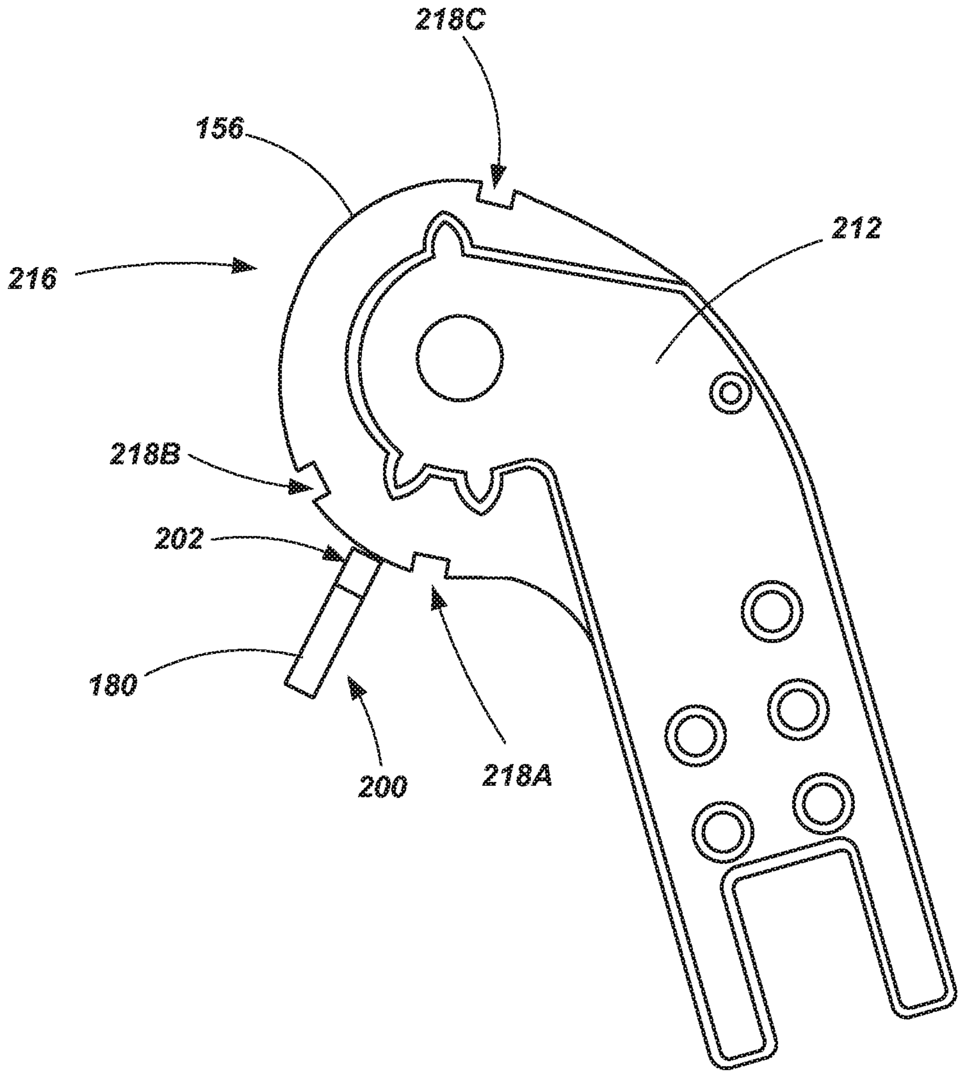

As noted above, with the lock plate 180 in a retracted position (e.g., as shown in FIGS. 8 and 9), the hinge assemblies 150 and 152 may rotate relative to each other about the hinge pin 158 such as shown in FIGS. 11 and 12. When the hinge assemblies 150 and 152 rotate relative to each other through a specified angle of rotation, a radial projection (e.g., radial projection 230B) formed on the spacer plate 212 of the inner assembly 152 engages the release structure 192. When engaged by the radial projection (e.g., 230B), the release structure 192 is displaced along axis 184 within the cavity 224 such that the spaced fingers 196 insert themselves between the lock plate 180 and the retainer 186. The tapered profile of the fingers 196 provide a ramped surface such that the further the release structure 192 is displaced toward the lock plate 180, the further the retainer is displaced along axis 190 away from lock plate 180 until the protrusion 222 eventually disengages the opening 220, resulting in the lock plate 180 being released from the retainer and being displaced along axis 184 towards (but not completely to) a state of engagement. It is noted that in the embodiment shown, the spaced apart fingers 196 are positioned with one finger 196 on each side of the protrusion 222 such that the protrusion fits within a slot or gap formed between the two fingers 196. It is also noted that a surface of the retainer 186 may be tapered or ramped in addition to, or in the alternative to, the ramped or tapered configuration of the fingers 196, in order to facilitate the displacement of the retainer 186 along a first axis (e.g., 190) responsive to displacement of the retainer 192 along a second axis (e.g., 184), the two axis being positioned at angles relative to one another (e.g., at right angles relative to one another).

Figure 13:
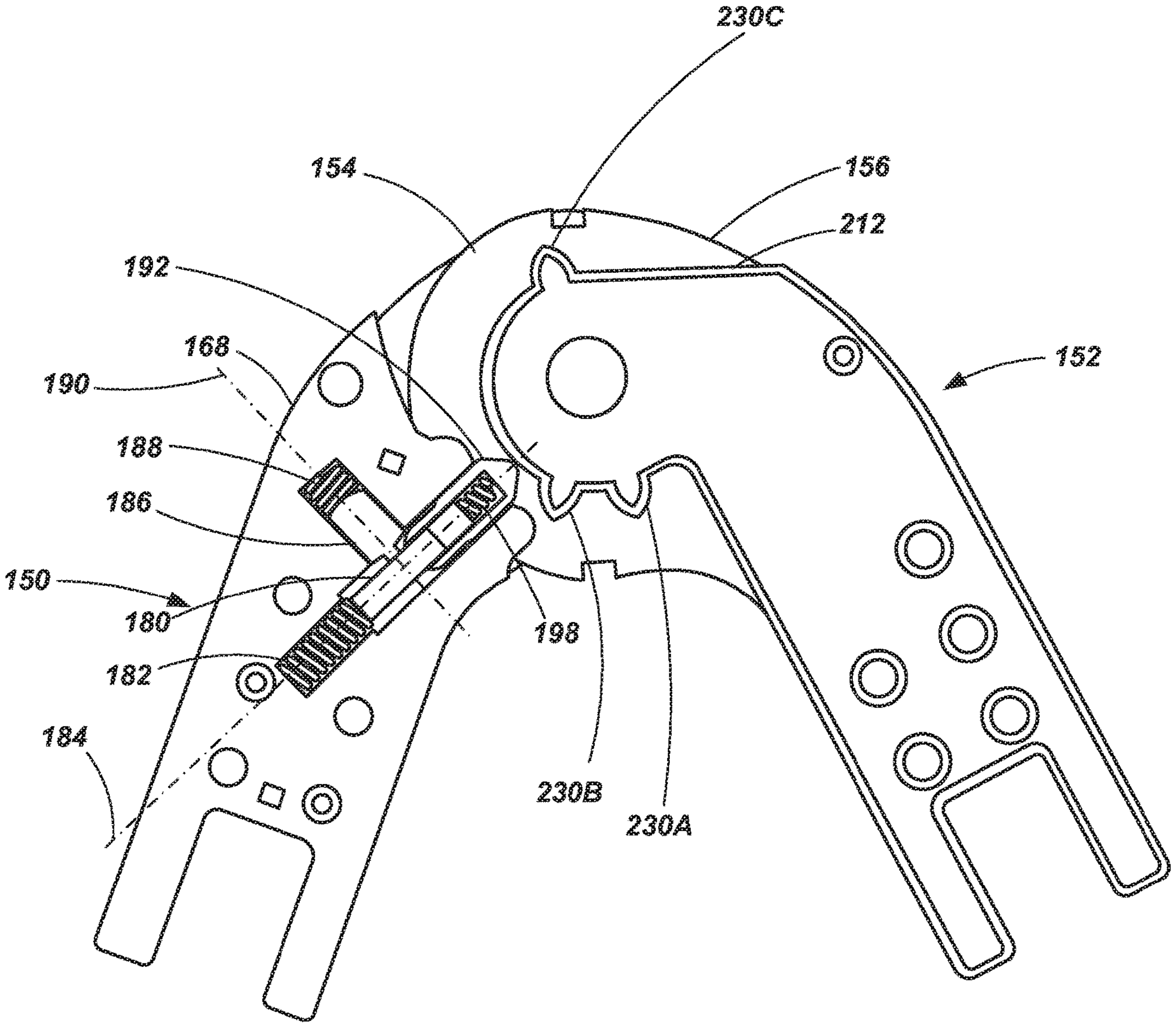
FIGS. 13 and 14 show portions of the hinge of FIG. 2 while the ladder is locked in a first deployed state.
Figure 14:
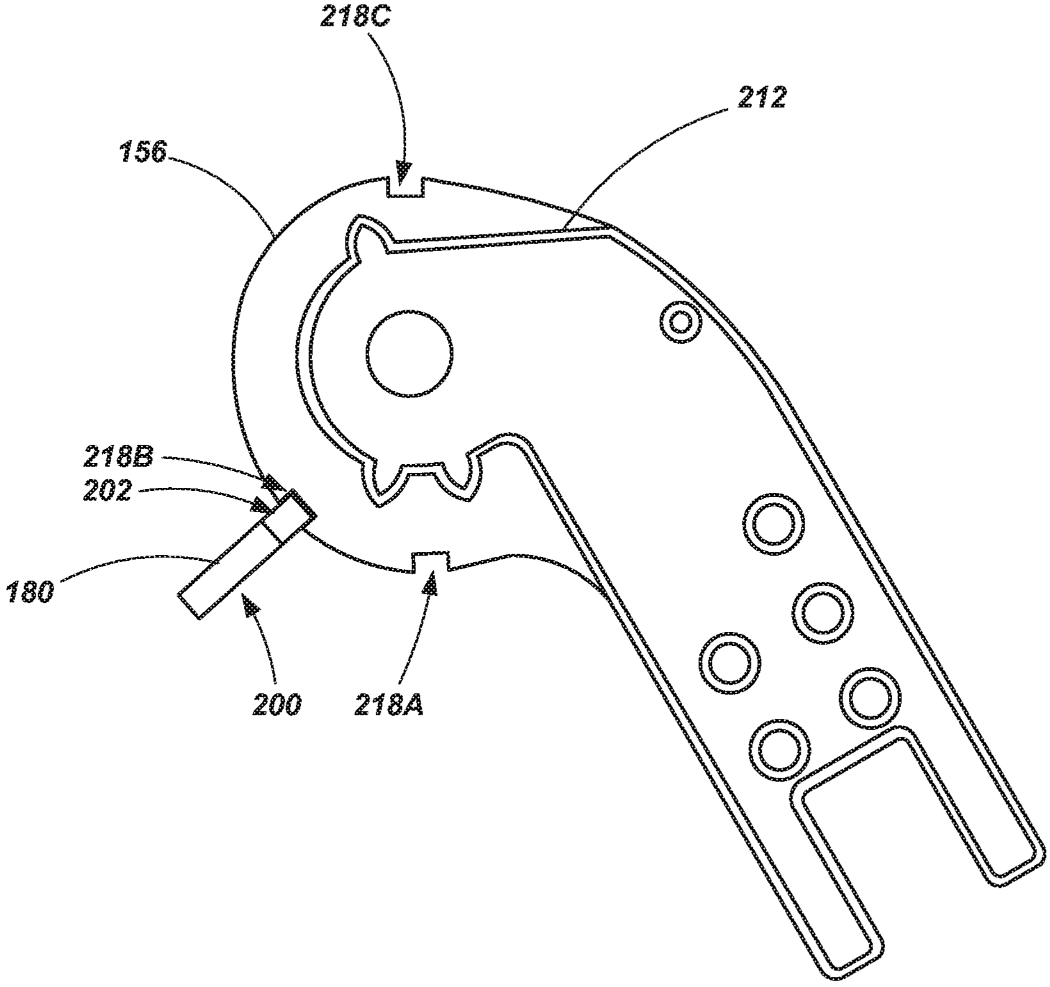

With the lock plate 180 released from the retainer 186, it is displaced until an upper surface thereof abuts the peripheral edge of the second portion 216 of the hinge plates 156 (see FIG. 12). The lock plate 180 maintains this position, staying in sliding abutment with the peripheral edge of the hinge plate 156, while the hinge assemblies 150 and 152 continue relative rotation about the hinge pin 158. When the hinge assemblies 150 and 152 have rotated relative to one another such that a notch or recess is aligned with the lock plate 180 (e.g., when recess 218B is aligned with lock plate 180 such as shown in FIGS. 13 and 14), the lock plate 180 engages the recess, due to the biasing force applied by the lock plate spring 182) and locks the hinge assemblies 150 and 152 prohibiting further relative rotation. Thus, as shown in FIGS. 13 and 14, with the locking plate 180 engaged in recess 218B, the ladder 100 is in a step ladder configuration such as shown in FIG. 1, with the rail assemblies 102 and 114 extending away from each other at an acute angle to provide a self-supporting ladder configuration.

To adjust the hinge mechanism 140 from the configuration shown in FIGS. 13 and 14 to another configuration, a user may apply a force to one or both of the handles 162 to actuate the adjustment mechanism 160, such as discussed above, causing the lock plate 180 to be displaced within its cavity 224 until it is engaged by the retainer 186 and held in a retracted state thereby. The hinge assemblies 150 and 152 may then be rotated relative to one another until a radial projection (e.g., radial projection 230B or 230C, depending on the direction of rotation) actuates the release structure 192, causing the retainer 186 to be retracted from the lock plate 180, enabling the lock plate 180 to be released from the retracted state and be displaced to the point that it abuts the peripheral edge of the hinge plates 156 as has been previously described.

Figure 15:
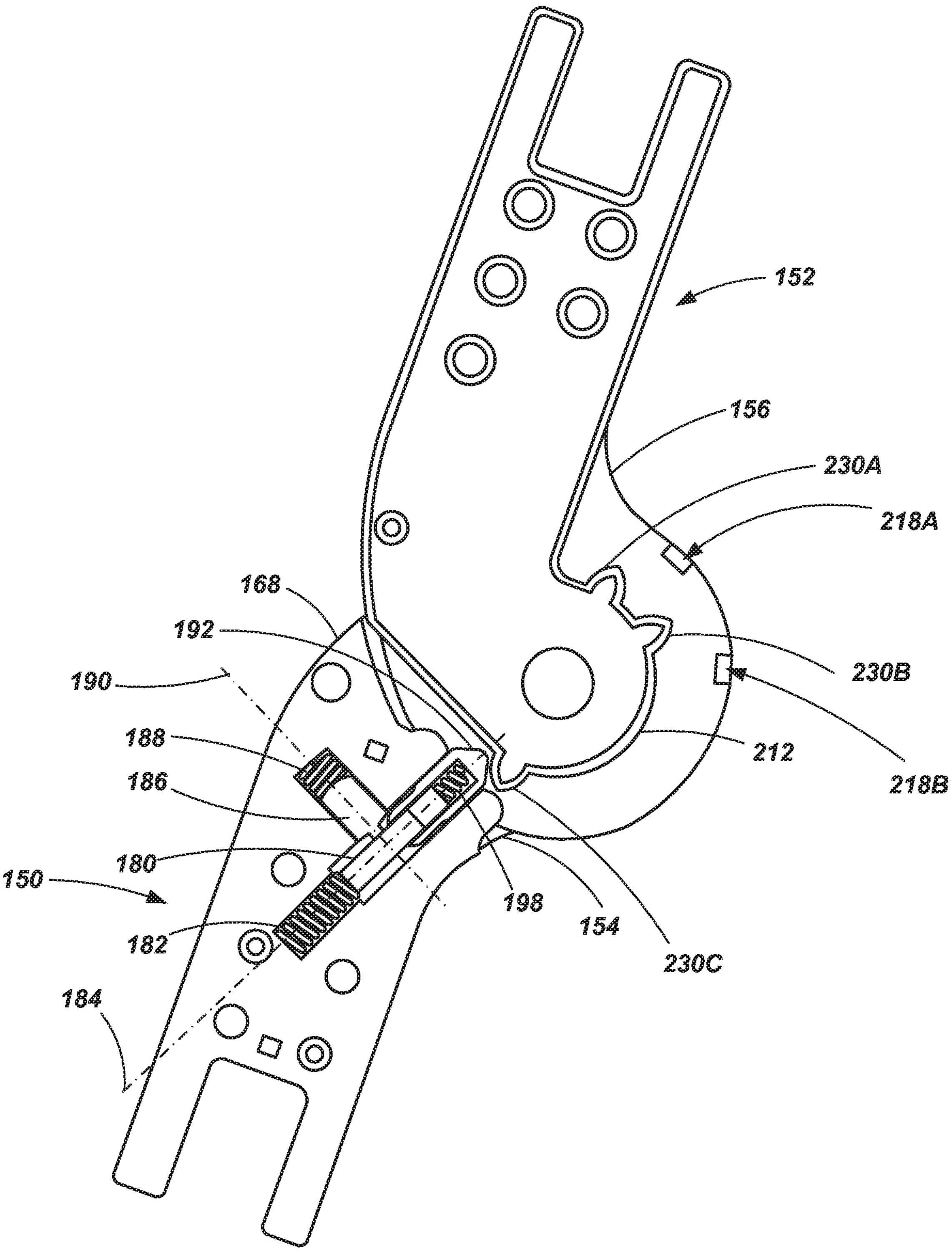
FIGS. 15 and 16 show portions of the hinge of FIG. 2 while in the ladder is locked in a second deployed state.
Figure 16:
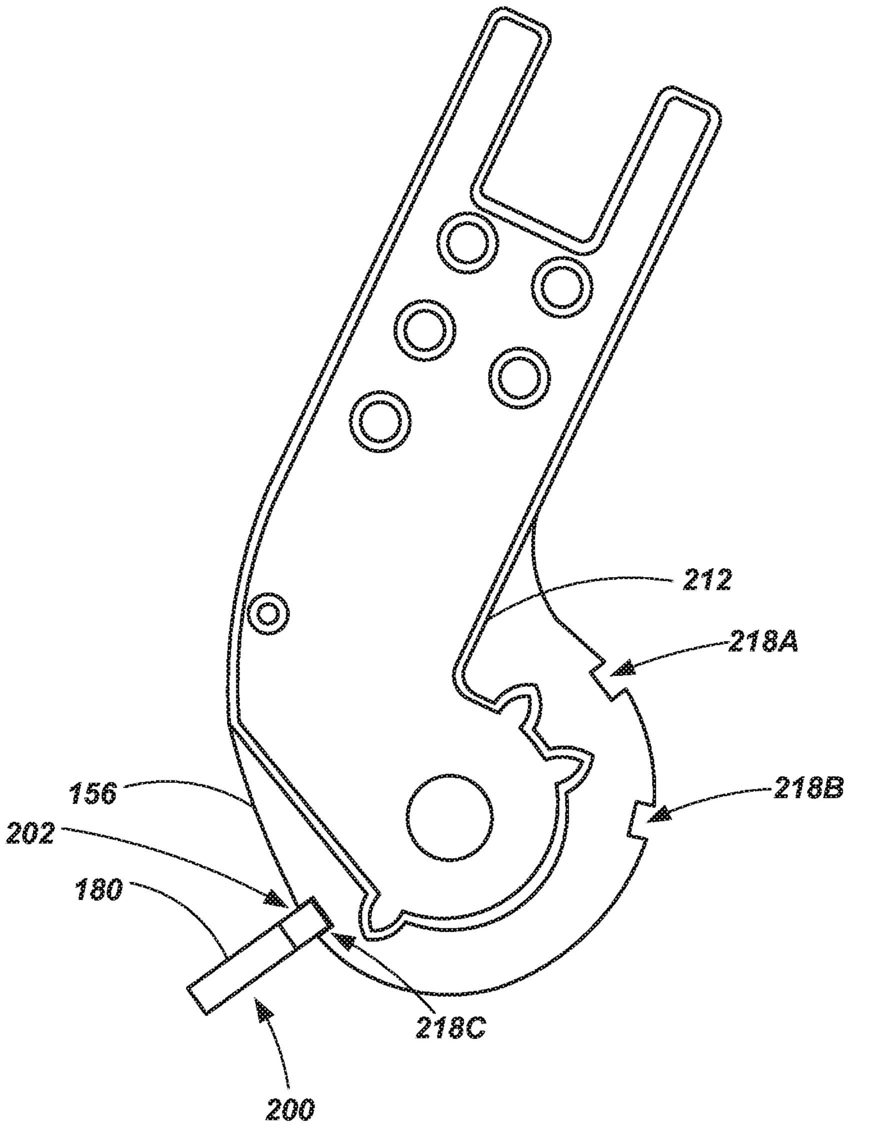

As shown in FIGS. 15 and 16, the hinge mechanism 140 may be adjusted such that the lock plate 180 engages notch 218C which places the hinge assemblies 150 and 152 in a configuration such that the first portion of each hinge assembly (the portion configured for coupling with ladder rails) extend away from each other in a straight line or in a common plane, placing the ladder in an extension ladder configuration.

It is noted that the radial projections 230A-230C of the spacer plate are positioned such that, after the lock plate 180 has been retracted from a recess 218A-218C and retained in a retracted state by the retainer 186, minimal relative rotation of the hinge assemblies 150 and 152 is required to actuate the release structure 192 in the manner described above, placing the lock member 180 into contact with the peripheral edge of the hinge plate 156 of the inner hinge assembly 152. Additionally, it is noted that radial projection 230A is placed such that inward rotation of the hinge assemblies beyond the stored state (i.e., beyond the position shown in FIGS. 7 and 8) will cause the lock plate 180 to be released from the retainer 186, enabling the lock plate to reengage recess 218A without having to rotate the hinge assemblies 150 and 152 toward the step ladder configuration.

The hinge mechanism of the present disclosure provides an adjustable hinge for a ladder that is both light weight and strong. The construction of the hinge provides for simple and efficient manufacture using cost effective techniques and the possibility of using a variety of materials. In one embodiment, the various hinge plates may be formed of a metal (e.g., steel, aluminum, etc.), while the spacers may be formed of a plastic material. Components such as the hinge plates and spacer plates may be formed by molding, stamping, machining, a combination of such techniques or a variety of other techniques.

While embodiments of the disclosure may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of forming a ladder, the method comprising:

providing a first rail assembly having a first rail, a second rail and a first plurality of rungs extending between and coupled to the first rail and the second rail;

providing a second rail assembly having a third rail and a fourth rail;

coupling a first hinge mechanism between the first rail and the third rail;

coupling a second hinge mechanism between the second rail and the fourth rail;

configuring at least one of the first and second hinge mechanisms to include:

a first hinge assembly having at least one hinge plate, a second hinge assembly having at least one hinge plate, the first hinge assembly being rotatably coupled to the second hinge assembly, an adjustment mechanism configured to selectively permit and prohibit relative rotation of the first hinge assembly and the second hinge assembly, configuring the adjustment mechanism to include:

a lock plate biased in a first direction along a first axis, the lock plate having a first portion configured to engage at least one recess formed on a periphery of the at least one hinge plate of the second hinge assembly, the lock plate having an opening formed in a surface thereof, a retainer being biased in a second direction along a second axis and toward contact with the lock plate, the retainer having a protrusion configured for selective engagement with the opening in the lock plate, and a release structure configured to be displaced along the first axis such that a portion of the release structure becomes interposed between the retainer and the lock plate to displace the retainer opposite the second direction and displacing the protrusion from the opening of the lock plate such that no part of the retainer is in the opening of the lock plate.

2. The method according to claim 1, further comprising positioning a biasing member between the release structure and the lock plate and configuring the biasing member to bias the release structure away from the lock plate in the first direction.

3. The method according of claim 1, wherein the at least one recess formed on the periphery of the at least one hinge plate of the second hinge assembly includes at least three recesses formed at spaced circumferential locations on the periphery.

4. The method according of claim 1, wherein the at least one hinge plate of the first hinge assembly includes a first pair of hinge plates and at least one spacer plate disposed between the first pair of hinge plates.

5. The method according of claim 4, wherein the at least one hinge plate of the second hinge assembly includes a second pair of hinge plates and at least one other spacer plate disposed between the second pair of hinge plates.

6. The method according of claim 5, further comprising disposing the second pair of hinge plates laterally inwardly of the first pair of hinge plates along an axis upon which relative rotation of the first hinge assembly and the second hinge assembly is effected.

7. The method according of claim 5, wherein the at least one other spacer plate includes at least one radial projection configured to engage the release structure upon relative rotation of the first hinge assembly and the second hinge assembly to a predetermined angular position.

8. The method according of claim 7, wherein the at least one radial projection includes at least three radial projections corresponding with three different predetermined angular positions of the first rail assembly relative to the second rail assembly.

9. The method according of claim 4, further comprising positioning at least a portion of the lock plate in a first channel formed in the at least one spacer plate and positioning at least a portion of the retainer in a second channel formed in the at least one spacer plate.

10. The method according of claim 1, wherein the release structure includes two spaced apart arms and further comprising positioning a first arm on a first side of the lock plate and positioning a second arm on a second side of the lock plate.

11. The method according of claim 10, further comprising configuring at least one of the two spaced apart arms to exhibit a tapered geometry for engagement with the retainer.

12. The method according of claim 10, further comprising configuring at least one of the two spaced apart arms with two spaced apart fingers to define a slot therebetween, the slot being sized to receive a portion of the protrusion.

13. The method according of claim 1, wherein the lock plate includes a main body portion and at least one laterally extending portion.

14. The method according of claim 13, further comprising extending the at least one laterally extending portion through a slot formed in the at least one hinge plate of the first hinge assembly.

15. The method according of claim 14, further comprising coupling a first handle with the at least one laterally extending portion.

16. The method according of claim 1, further comprising configuring the lock plate to be substantially T-shaped.

17. The method according of claim 1, further comprising rotatably coupling the first hinge assembly to the second hinge assembly about a rotational axis, wherein the first axis and the second axis are substantially orthogonal to one another, and wherein the first axis and the second axis each extend in a non-parallel direction relative to the rotational axis.

* * * * *